US010569803B2

(12) United States Patent
Montag

(10) Patent No.: US 10,569,803 B2
(45) Date of Patent: Feb. 25, 2020

(54) TOW BEHIND STEERABLE CADDY TRAILER

(71) Applicant: Montag Investments, LLC, Emmetsburg, IA (US)

(72) Inventor: Roger A. Montag, Malcolm, NE (US)

(73) Assignee: MONTAG INVESTMENTS, LLC, Emmetsburg, IA (US)

( * ) Notice: Subject to any disclaimer, the term of this patent is extended or adjusted under 35 U.S.C. 154(b) by 0 days.

(21) Appl. No.: 15/150,148

(22) Filed: May 9, 2016

(65) Prior Publication Data

US 2016/0251029 A1 Sep. 1, 2016

Related U.S. Application Data

(63) Continuation of application No. 14/695,089, filed on Apr. 24, 2015, now Pat. No. 9,914,478, which is a continuation of application No. 12/964,299, filed on Dec. 9, 2010, now Pat. No. 9,022,409, which is a continuation of application No. 11/286,654, filed on Nov. 23, 2005, now Pat. No. 7,874,570.

(51) Int. Cl.
*B62D 13/00* (2006.01)
*B62D 13/04* (2006.01)
*B62D 63/06* (2006.01)

(52) U.S. Cl.
CPC .............. *B62D 13/04* (2013.01); *B62D 13/00* (2013.01); *B62D 63/062* (2013.01)

(58) Field of Classification Search
CPC ........ B62D 13/00; B62D 13/04; B62D 13/06; B62D 63/062; B62D 63/064; B62D 63/065
See application file for complete search history.

(56) References Cited

U.S. PATENT DOCUMENTS

| 808,440 A | 12/1905 | Drew |
| 886,059 A | 4/1908 | Jorstad |
| 917,457 A | 4/1909 | Kline |
| 1,222,666 A | 4/1917 | Porter |
| 1,378,436 A | 5/1921 | Arato |

(Continued)

FOREIGN PATENT DOCUMENTS

| CA | 2240791 A1 | 1/1999 |
| EP | 1336549 B1 | 3/2009 |

(Continued)

OTHER PUBLICATIONS

"Trailer Assembly", Hobart Brothers Company, pp. 1-18, Ohio 45373 (Apr. 1, 1998).

(Continued)

*Primary Examiner* — Joseph M Rocca
*Assistant Examiner* — Maurice L Williams
(74) *Attorney, Agent, or Firm* — Goodhue, Coleman & Owens, P.C.

(57) ABSTRACT

A steerable caddy trailer is provided that has an improved structure including a main frame assembly, spindle assemblies attached to each end of the main frame for attachment of a wheel, a pair of swinging arms forwardly extending from the main frame and pivotally attached to the main frame, and tie rods connecting the swinging arms with the spindle assembly such that pivoting of the swinging arms steers the wheel.

17 Claims, 3 Drawing Sheets

(56) References Cited

U.S. PATENT DOCUMENTS

| | | |
|---|---|---|
| 1,379,982 A | 5/1921 | Hartsock |
| 1,600,635 A | 9/1926 | Isachsen |
| 1,618,094 A | 2/1927 | King |
| 1,811,798 A | 12/1928 | Lucke |
| 1,838,499 A | 12/1931 | Robinson |
| 1,886,640 A | 11/1932 | Campbell, Jr. |
| 1,894,194 A | 1/1933 | Overmon |
| 1,925,712 A | 9/1933 | Campbell, Jr. |
| 1,999,748 A | 4/1935 | Baratelli |
| 2,059,419 A | 11/1936 | Tuft |
| 2,092,683 A | 9/1937 | Stidham |
| 2,180,257 A | 11/1939 | Rollins |
| 2,431,626 A | 11/1947 | Townsend |
| 2,450,215 A | 9/1948 | Wilson |
| 2,457,397 A | 12/1948 | Richards |
| 2,485,853 A | 10/1949 | Willet |
| 2,559,142 A | 7/1951 | Woodworth |
| 2,559,487 A | 7/1951 | Whitlow |
| 2,579,118 A | 12/1951 | Land |
| 2,582,455 A | 1/1952 | Potter |
| 2,640,706 A | 6/1953 | Kuster |
| 2,885,218 A | 5/1959 | Cosley |
| 2,913,256 A | 11/1959 | Sharpe |
| 3,197,230 A | 7/1965 | Albert |
| 3,399,771 A | 9/1968 | Hryniowski |
| 3,430,975 A | 3/1969 | Wolf |
| 3,454,285 A | 7/1969 | Peursem |
| 3,690,698 A | 9/1972 | Humes |
| 3,695,628 A | 10/1972 | Fisher |
| 3,753,580 A | 8/1973 | Folkert |
| 3,880,439 A | 4/1975 | Karl |
| 3,930,669 A | 1/1976 | Kollander et al. |
| 3,995,668 A | 12/1976 | Goodman |
| 4,024,985 A | 5/1977 | Iinoya et al. |
| 4,128,191 A | 12/1978 | Frase et al. |
| 4,147,373 A | 4/1979 | Cully |
| 4,171,825 A | 10/1979 | Woodell |
| 4,191,394 A | 3/1980 | Kasselmann |
| 4,208,063 A | 6/1980 | Baker et al. |
| 4,405,147 A | 9/1983 | Horsman et al. |
| 4,451,058 A | 5/1984 | Curry |
| 4,655,467 A | 4/1987 | Kitzmiller et al. |
| 4,720,119 A | 1/1988 | Ritter |
| 4,767,322 A | 8/1988 | Beckenbach et al. |
| 4,970,830 A | 11/1990 | Schlick |
| 5,244,226 A | 9/1993 | Bergh |
| 5,335,856 A | 8/1994 | Nathan |
| 5,364,117 A | 11/1994 | Keith |
| 5,382,041 A | 1/1995 | Keith |
| 5,492,351 A | 2/1996 | Salo |
| 5,529,316 A | 6/1996 | Mattila |
| 6,193,257 B1 | 2/2001 | Lutz |
| 6,520,521 B2 | 2/2003 | Mayfield |
| 7,188,850 B2 | 3/2007 | Ziech et al. |
| 7,311,446 B2 | 12/2007 | Koschinat |
| 7,350,795 B2 | 4/2008 | Svartz et al. |
| 7,810,832 B2 | 10/2010 | Montag |
| 7,874,570 B2 | 1/2011 | Montag |
| 8,117,646 B2 | 2/2012 | Lorsch |
| 9,022,409 B2 | 5/2015 | Montag |
| 2006/0125208 A1 * | 6/2006 | Nejsum ................ B62D 13/025 280/459 |
| 2007/0145713 A1 | 6/2007 | Montag |
| 2007/0176382 A1 | 8/2007 | Truchsess et al. |
| 2011/0079985 A1 | 4/2011 | Montag |

FOREIGN PATENT DOCUMENTS

| | | | |
|---|---|---|---|
| GB | 695535 | 1/1951 | |
| WO | WO-2004050457 A1 * | 6/2004 | ........... B62D 13/025 |

OTHER PUBLICATIONS

"Trailer Kit", Hobart Brothers Company, p. 1-20 (Aug. 5, 1998).
"Trailer Running Gear", Hadco Engineering, Inc., pp. 1-58 (Jul. 30, 2001).

* cited by examiner

TOW BEHIND STEERABLE CADDY TRAILER

CROSS-REFERENCE TO RELATED APPLICATIONS

This is a Continuation of U.S. application Ser. No. 14/695,089 filed on Apr. 24, 2015, which is a Continuation of U.S. application Ser. No. 12/964,299 filed Dec. 9, 2010 now U.S. Pat. No. 9,022,409 issued May 5, 2015, which is a Continuation of U.S. application Ser. No. 11/286,654 filed Nov. 23, 2005 now U.S. Pat. No. 7,874,570 issued Jan. 25, 2011, which the applications are hereby incorporated by reference in their entirety.

BACKGROUND OF THE INVENTION

The invention generally pertains to trailers and specifically to trailers designed for a tight turning radius.

Prior art trailers have been designed which provide a tight turning radius; however, these trailers use complicated structures to turn the trailer's wheels.

U.S. Pat. No. 1,600,635, issued to Isachsen on Sep. 21, 1926, shows an arrangement of a frame 11, and a steering rod 7 independent of the frame 11. The steering rod 7 is fastened to crank arm 3, then secured to a knuckle joint 4, and connected to a second knuckle joint 4' using arms 5 and a connecting bar 8. This complicated structure functions to turn the wheels 10.

U.S. Pat. No. 2,450,215 issued to Wilson on Sep. 28, 1948, uses multiple arms and steering links 29 and 14. This complicated structure functions to turn the wheels 14.

U.S. Pat. No. 2,092,683, issued to Stidham on September 1937, shows a non-conventional system using parallel cable 32 and a draw frame system 21. These two systems must operate together in order to turn the wheels 14.

The above-subject patents are all structures which function to permit the wheels to turn on stub axles. Unfortunately, each is a complicated structure and includes multiple moving parts.

Therefore, there is a need to produce a simplified structure with fewer moving parts to reduce costs associated with manufacturing, tooling and assembly.

Additionally, the complicated structures limit the amount of weight that may be placed upon them. Accordingly, it is a still further objective of the present invention to provide a trailer that may have a high maximum payload for hauling a great amount of weight associated with farm products such as spray tanks, fertilizer, and seed.

These and other objectives will become apparent from the following specification and drawings.

BRIEF SUMMARY OF THE INVENTION

The foregoing objectives may be achieved using a tow behind steerable caddy trailer having a main frame assembly having opposite ends, a wheel pivotally attached to each end of the main frame assembly, a pair of swinging arms pivotally attached to the main frame assembly and extending forward from the main frame. The swinging arms are spaced apart from one another such that each swinging arm is positioned adjacent a wheel. The swinging arms can be maintained parallel or non-parallel to one another. The trailer has a support structure attached to the main frame assembly that can support a platform, tank, hopper, etc. Additionally, it has been contemplated that tracks could be used in place of the wheels for supporting platforms, tanks and hoppers exceeding the weight limits for a wheel.

DETAILED DESCRIPTION OF THE PREFERRED EMBODIMENT

Figure 1:
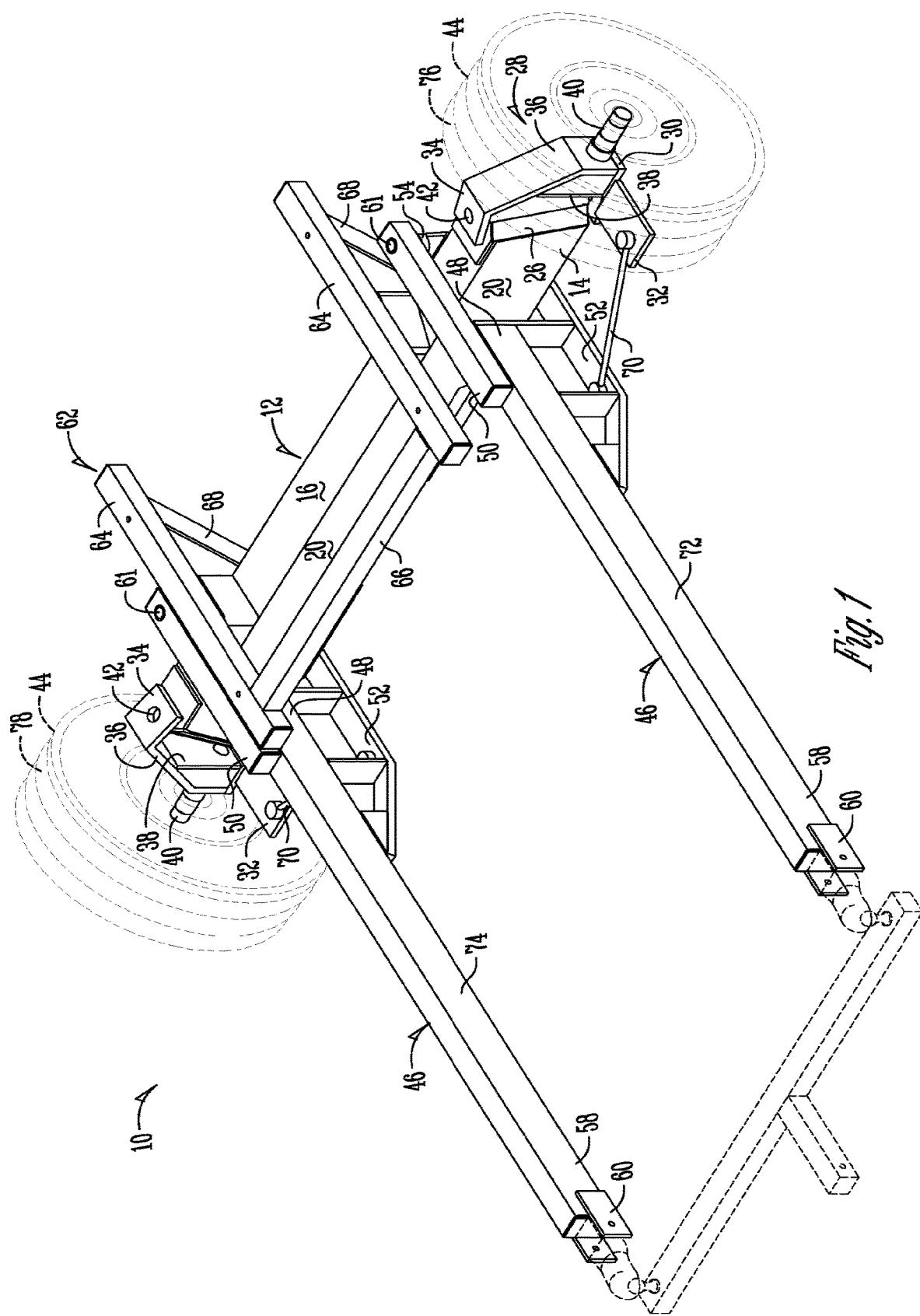
FIG. 1 is a perspective view of a tow behind steerable caddy.
Figure 2:
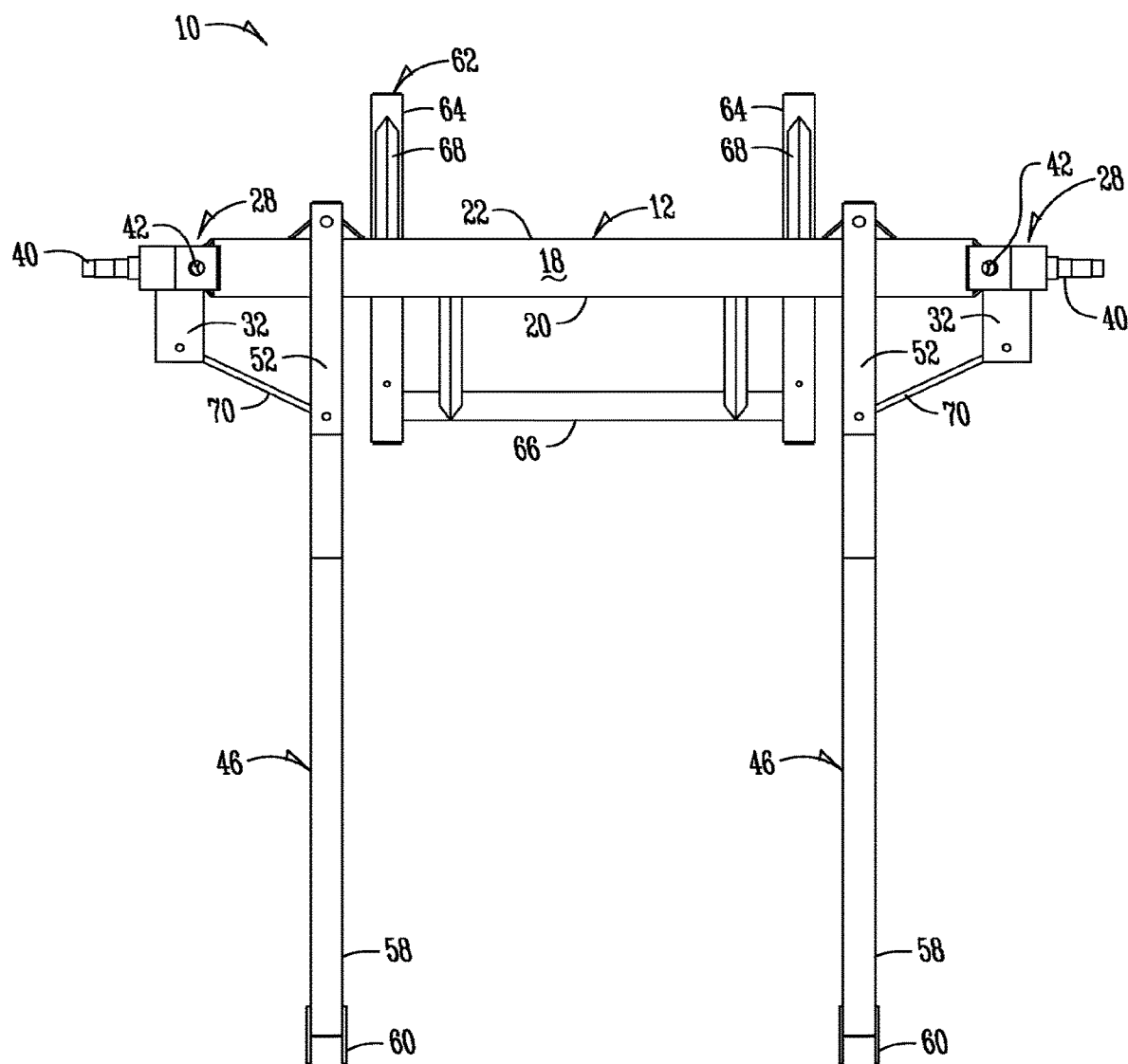
FIG. 2 is a top view of the tow behind steerable caddy.
Figure 3:
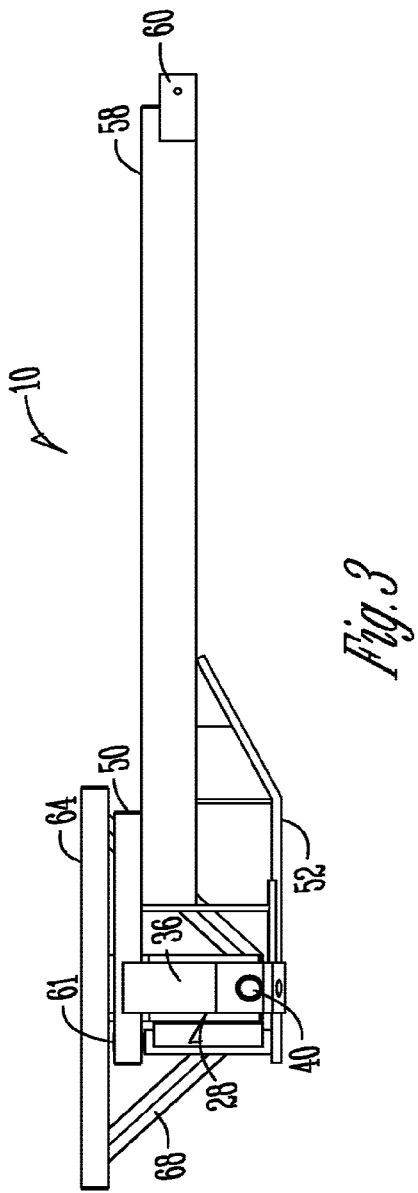
FIG. 3 is a side view of the tow behind steerable caddy.
Figure 4:
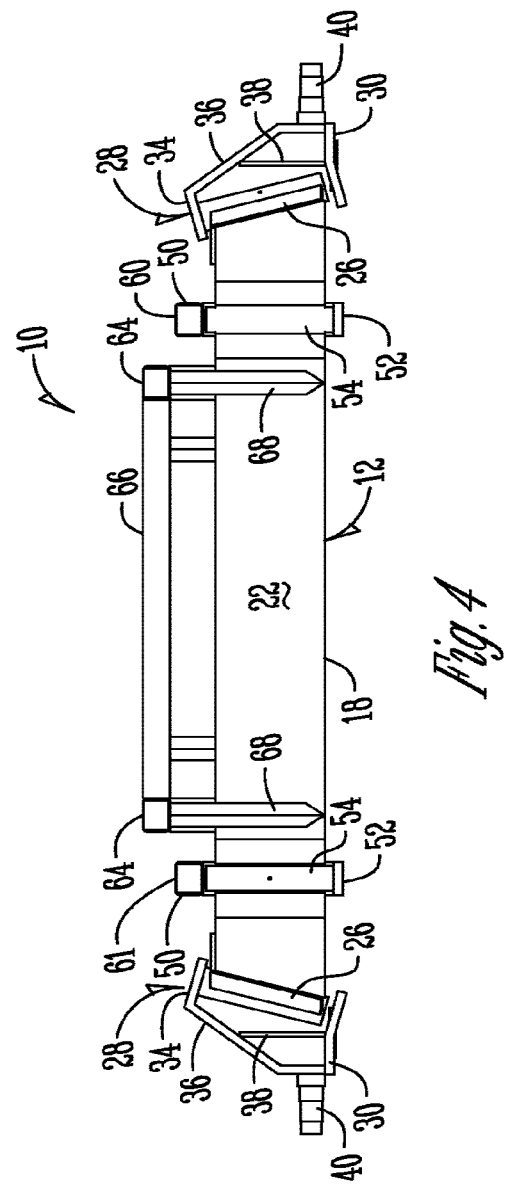
FIG. 4 is a rear view of the tow behind steerable caddy.

With reference to FIGS. 1-4, numeral 10 refers to a tow behind steerable caddy. The tow behind steerable caddy trailer 10 is designed to follow behind a tractor, an implement pulled by a tractor, or other vehicle.

The trailer 10 is designed to follow in the tracks of the towing vehicle to navigate tight turning radiuses. The tow behind steerable caddy trailer 10 thus may negotiate tight turning radiuses in a field with very few end rows or with equipment that has a very narrow operating width.

The steerable caddy trailer 10 has a main frame assembly 12 illustrated as a metal square tube. The main frame assembly 12 has opposite ends 14, a top side 16, a bottom side 18, a front side 20, and a back side 22. Angled end caps 26 are attached at each end 14 of the main frame assembly 12. It has been contemplated that the end caps 26 could also be a vertical endcap rather than an angled endcap 26. A vertical endcap may be used in conjunction with a track or in applications requiring additional structural strength to support heavy loads.

A spindle assembly 28 is pivotally attached at each end 14 of the main frame assembly 12. The spindle assembly 28 has a base plate 30 and a top plate 34 connected by an angled extension 36 which ends in a vertical surface with a spindle 40 for a wheel 44. The base plate 30 and top plate 34 are attached to the angled end cap 26 by a pivot pin 42. The spindle assembly has a vertical support 38 which strengthens the connection of the base plate 30 and the top plate 34 to strengthen the spindle assembly 28.

A forward base member 32 is provided to extend from the base plate 30 and has a hole for connecting a first end of a tie rod 70.

Swinging arms 46 extend from the main frame assembly 12. Each swinging arm member 46 has a rear end 48 that pivotally attaches to the main frame assembly 12. The rear end 48 has a top support 50 and a bottom support 52, which extends above and below the main frame assembly 12 to pivotally attach to a cylinder 54 at the back side 22 of the main frame assembly 12 by a pivot pin 61. The bottom support 52 also has a hole for receiving a front end of tie rod 70. A front end 58 of the swinging arm members 46 has an adapter 60 for attaching to a rigid cross member, such as the exemplary rigid cross member shown in FIG. 1 in dashed lines. The rigid cross member could be a piece of square tubing (as shown). The rigid cross member could also be a bumper, a vehicle, a tractor or other farm implement. It is preferred that the swinging arm members 46 be pivotally mounted to a rigid cross member. For example, attaching a hitch to the adapter 60 and a ball to both ends of the rigid cross member (as shown in FIG. 1 in dashed lines) allows the swinging arm members 46 to pivot about the balls. Similarly, swinging arm members 46 could also be pivotally attached to a bumper or another rigid cross member as part of a farm implement.

In FIG. 1, the swinging arm members 46 are shown parallel to each other and the tires 44 are shown perpendicular to the main frame assembly 12. However, the swinging arm members 46 need not be parallel to each other for the trailer 10 to steer. Adjusting the swinging arm members 46 affects the turning radius of the steerable caddy trailer 10. Regardless of the configuration, whether the swinging arm members 46 are parallel or moved inward closer to each other, the tie rods 70 can be adjusted to keep the tires perpendicular to the main frame assembly 12.

A platform support 62 is provided that has side supports 64 and a front support 66 connecting the two side supports 64 and sub-platform supports 68. The platform support 62 balances the weight of a platform, tank, hopper or other evenly towards the front and back of the main frame assembly 12.

In operation, the caddy is pulled behind the implement and/or vehicle by pivotally connecting the swinging arm members 46 to a rigid cross member. Should the towing vehicle or farm implement turn left this will simultaneously cause the left swinging arm 72 to shift rearward toward the main frame assembly 12 and the right swinging arm 74 to shift forward away from the main frame assembly 12. Shifting the left swinging arm 72 rearward towards the main frame assembly causes the tie-rod linkage 70 to move the spindle assembly such that the left wheel 76 steers right. Similarly, shifting the right swinging arm 74 forward away from the main frame assembly causes the tie-rod linkage 70 to move the spindle assembly such that the right wheel 78 steers right, also. Thus, when the towing vehicle turns left the wheels 44 on the steerable caddy 10 turn right so as to track the towing vehicle.

Should the towing vehicle or farm implement turn right this will simultaneously cause the left swinging arm 72 to shift forward away from the main frame assembly 12 and the right swinging arm 74 to shift rearward toward the main frame assembly 12. Shifting the left swinging arm 72 forward away from the main frame assembly causes the tie-rod linkage 70 to move the spindle assembly such that the left wheel 76 steers left. Similarly, shifting the right swinging arm 74 rearward toward the main frame assembly causes the tie-rod linkage 70 to move the spindle assembly such that the right wheel 78 steers left, also. Thus, when the towing vehicle turns left the wheels 44 on the steerable caddy 10 turn right so as to track the towing vehicle.

In either instance after the towing vehicle turns left or right and returns to driving a straight course, the wheels 44 return to a position perpendicular to the main frame assembly 12. In this fashion, the steerable caddy trailer is maintained in virtually the same turning radius as the vehicle and/or implement.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A steerable trailer configured for attachment to and steering by a towing vehicle, comprising:
a main frame assembly having a main frame with a first end and a second end opposite the first end, a top side, a bottom side, a front side, and a back side;
a first end portion of the first end of the main frame, the first end portion terminating in a first angled end cap;
a second end portion of the second end of the main frame, the second end portion terminating in a second angled end cap;
a first spindle body having a top plate, an angled extension, a base plate, and a forward base member extending outwardly from the first spindle body in a forward direction, the top plate and the base plate pivotally coupled to the first end cap of the first end portion, the first spindle body has a spindle extending outwardly away from the first spindle body;
a second spindle body having a top plate, an angled extension, a base plate, and a forward base member extending outwardly from the second spindle body in a forward direction, the top plate and the base plate pivotally coupled to the second end cap of the second end portion, the second spindle body has a spindle extending outwardly away from the second spindle body;
a first wheel operatively attached to the spindle on the first spindle body;
a second wheel operatively attached to the spindle on the second spindle body;
one or more tank supports attached to the main frame assembly, the one or more tank supports adapted to operatively support a tank positioned atop the main frame assembly;
a first arm having a first back end portion, the first arm extending forwardly from the first back end portion away from the main frame and terminating in a first front end portion, the first front end portion has a pivoting attachment member configured for operatively securing to a cross member operably attached to the towing vehicle;
a second arm having a second back end portion, the second arm extending forwardly from the first back end portion away from the main frame and terminating in a second front end portion, the second front end portion has a pivoting attachment member configured for operatively securing to the cross member operably attached to the towing vehicle;
a first tie-rod having a first end operatively attached to the forward base member extending outwardly away from the first spindle body and a second end of the first tie-rod operatively secured at the first back end portion whereby movement imparted from the cross member to the first arm in a rearward direction toward the main frame pulls the first tie-rod in an inwardly direction thereby operatively steering the first wheel right; and
a second tie-rod having a first end operatively attached to the forward base member extending outwardly away from the second spindle body and a second end of the second tie-rod operatively secured at the second back end portion whereby movement imparted from the cross member to the second arm in a direction away from the main frame pushes the second tie-rod in an outwardly direction thereby operatively steering the second wheel right;
wherein movement of the first tie-rod and first wheel is caused by steering the towing vehicle left thereby imparting a rearward movement toward the main frame to a left side of the cross member and the first arm thereby pulling the first tie-rod in the inwardly direction and steering the first wheel right and wherein movement of the second tie-rod and second wheel is caused by steering the towing vehicle left thereby imparting a forward movement away from the main frame to a right side of the cross member and the second arm thereby pushing the second tie-rod in the outwardly direction;

wherein movement of the first tie-rod and first wheel is caused by steering the towing vehicle right thereby imparting a forward movement away from the main frame to a left side of the cross member and the first arm thereby pushing the first tie-rod in the outwardly direction and steering the first wheel left and wherein movement of the second tie-rod and second wheel is caused by steering the towing vehicle right thereby imparting a rearward movement toward the main frame to a right side of the cross member and the second arm thereby pulling the second tie-rod in the inwardly direction.

2. The steerable trailer of claim 1 wherein movement imparted from the cross member to the first arm in a direction away from the main frame pushes the first tie rod in an outwardly direction thereby operatively steering the first wheel left.

3. The steerable trailer of claim 1 wherein movement imparted from the cross member to the second arm in a rearward direction toward the main frame pulls the second tie-rod in an inwardly direction thereby operatively steering the second wheel left.

4. The steerable trailer of claim 1 wherein the first tie-rod is operatively connected to a plate portion operatively secured to the first arm.

5. The steerable trailer of claim 1 wherein the second tie-rod is operatively connected to a plate portion operatively secured to the second arm.

6. The steerable trailer of claim 1 wherein the cross member is configured for operatively securing to an agricultural implement whereby steering the agricultural implement left imparts movement to the cross member thereby imparting movement to:
   a. the first arm in the rearward direction toward the main frame, wherein movement of the first arm in the rearward direction operatively pulls the first tie-rod in the inwardly direction for steering the first wheel right; and
   b. the second arm in the forward direction away from the main frame, wherein movement of the second arm in the forward direction operatively pushes the second tie-rod in the outwardly direction for steering the second wheel right.

7. The steerable trailer of claim 1 wherein the cross member is configured for operatively securing to an agricultural implement whereby steering the agricultural implement right imparts movement to the cross member thereby imparting movement to:
   a. the first arm in the forward direction away from the main frame, wherein movement of the first arm in the forward direction operatively pushes the first tie-rod in the outwardly direction for steering the first wheel left; and
   b. the second arm in the rearward direction toward the main frame, wherein movement of the second arm in the rearward direction operatively pulls the second tie-rod in the inwardly direction for steering the second wheel left.

8. A method for an agricultural trailer to track a towing implement, comprising:
   providing a main frame having a first end and a second end opposite the first end, a first spindle assembly having a top plate, an angled extension, a base plate and a forward base member, the top plate and the base plate pivotally coupled to a first angled end cap on the first end of the main frame for operatively supporting a first wheel, a second spindle assembly having a top plate, an angled extension, a base plate and a forward base member, the top plate and the base plate pivotally coupled to a second angled end cap on the second end of the main frame for operatively supporting a second wheel, a first arm extending forwardly away from the main frame and terminating in a first front end portion, the first front end portion has a pivoting attachment member configured for operatively securing to a cross member operatively configured for towing the agricultural trailer, a second arm extending forwardly away from the main frame and terminating in a second front end portion, the second front end portion has a pivoting attachment member configured for operatively securing to the cross member operatively configured for towing the agricultural trailer, a first tie-rod having a first end operatively attached at the first spindle assembly and a second end of the first tie-rod operatively secured for movement by the first arm, and a second tie-rod having a first end operatively attached at the second spindle assembly and a second end of the second tie-rod operatively secured for movement by the second arm;
   left steering from the towing implement imparting movement to the cross member for moving:
      a. the first arm in a rearward direction toward the main frame, wherein moving the first arm in the rearward direction operatively pulls the first tie-rod in an inwardly direction for steering the first wheel right for tracking the towing implement; and
      b. the second arm in the forward direction away from the main frame, wherein moving the second arm in the forward direction operatively pushes the second tie-rod in an outwardly direction for steering the second wheel right for tracking the towing implement;
   right steering from the towing implement imparting movement to the cross member for moving:
      a. the first arm in the forward direction away from the main frame, wherein moving the first arm in the forward direction operatively pushes the first tie-rod in the outwardly direction for steering the first wheel left for tracking the towing implement; and
      b. the second arm in the rearward direction toward the main frame, wherein moving the second arm in the rearward direction operatively pulls the second tie-rod in the inwardly direction for steering the second wheel left for tracking the towing implement;
   moving first tie-rod and the second tie-rod with the rearward and forward movement of the cross member during both left and right steering of the towing implement.

9. The method of claim 8 further comprising:
   rotating the first spindle assembly about the first angled end cap of the main frame for tracking the towing implement; and
   rotating the second spindle assembly about the second angled end cap of the main frame for tracking the towing implement.

10. The method of claim 8 further comprising:
    rotating the first wheel about a first spindle operatively attached to the first spindle assembly for tracking the towing implement; and
    rotating the second wheel about a second spindle operatively attached to the second spindle assembly for tracking the towing implement.

11. The method of claim 8 further comprising:
shifting the first arm in a first direction and a first distance by movement of the tow bar operatively configured for towing the agricultural trailer; and
simultaneously shifting the second arm in a second direction equal and opposite to the first direction of the first arm and a second distance equal to the first distance of the first arm for tracking steering of the towing implement.

12. A steerable trailer, comprising:
a main frame assembly having a main frame with a first end and a second end opposite the first end, the first and second ends terminating in respective first and second angled end caps;
first and second spindle assemblies having a top plate, an angled extension, a base plate and a forward base member, the top plate and the base plate pivotally coupled to the respective first and second angled end caps, the first and second spindle assemblies comprise a spindle extending generally outwardly away from a spindle body and the forward base member extending generally outwardly away from the spindle body in a forward direction;
first and second wheels operatively attached to the respective first and second spindle assemblies;
first and second steering arms extending forwardly away from the main frame and terminating in respective first and second front ends operatively attached to a towing cross member;
first and second tie-rods operatively configured between the respective first and second spindle assemblies and the respective first and second steering arms, whereby movement imparted from the towing cross member to:
 a. the first steering arm in a rearward direction toward the main frame pulls the first tie-rod in an inwardly direction thereby operatively steering the first spindle assembly and the first wheel in a first direction;
 b. the second steering arm in a forward direction away from the main frame pushes the second tie-rod in an outwardly direction thereby operatively steering the second spindle assembly and the second wheel in the first direction;
 c. the first steering arm in a forward direction away the main frame pushes the first tie-rod in an outwardly direction thereby operatively steering the first spindle assembly and the first wheel in a second direction opposite the first direction; and
 d. the second steering arm in a rearward direction toward the main frame pulls the second tie-rod in an inwardly direction thereby operatively steering the second spindle assembly and the second wheel in the second direction opposite the first direction;
wherein the first tie-rod, the first wheel, the second tie-rod, and the second wheel are moved by the rearward and forward movement of the towing cross member during left and right steering of a towing implement.

13. The steerable trailer of claim 12 further comprising:
one or more tank supports attached to the main frame assembly, the one or more tank supports for operatively supporting a tank positioned atop the main frame assembly.

14. The steerable trailer of claim 12 wherein the respective first and second steering arms are generally parallel.

15. The steerable trailer of claim 12 further comprising:
a plate portion operatively attached to the first steering arm and the first tie-rod.

16. The steerable trailer of claim 15 wherein movement of the towing cross member imparts movement to the first wheel through the first steering arm, the plate portion and the first tie-rod for tracking steering of a towing implement.

17. The steerable trailer of claim 12 further comprising:
a plate portion operatively attached to the second steering arm and the second tie-rod, wherein movement of the towing cross member imparts movement to the second wheel through the second steering arm, the plate portion and the second tie-rod for tracking steering of a towing implement.

* * * * *